United States Patent
Kim et al.

(10) Patent No.: US 6,224,840 B1
(45) Date of Patent: May 1, 2001

(54) γ-Al₂O₃ SORBENT IMPREGNATED WITH ALKALI SALT AND CUO

(75) Inventors: Sang-Done Kim, Seoul; Sang-Mun Jeong, Taejon; Kyung-Seun Yoo, Pohang, all of (KR)

(73) Assignee: Korea Advanced Institute of Science and Technology (KR)

( * ) Notice: Subject to any disclaimer, the term of this patent is extended or adjusted under 35 U.S.C. 154(b) by 0 days.

(21) Appl. No.: 09/515,632

(22) Filed: Feb. 29, 2000

Related U.S. Application Data

(63) Continuation of application No. 09/148,752, filed on Sep. 4, 1998, now abandoned.

(30) Foreign Application Priority Data

Sep. 4, 1997 (KR) .................................................. 97-45857

(51) Int. Cl.⁷ ............................ B01J 27/08; B01J 27/138; B01J 23/72; B01J 20/04; B01J 20/08

(52) U.S. Cl. ................................ 423/244.02; 423/244.06; 423/244.07; 423/244.1; 502/34; 502/53; 502/224; 502/345; 502/415; 502/517

(58) Field of Search ..................................... 502/224, 345, 502/415, 400, 344, 517, 34, 53; 423/244.02, 244.06, 244.07, 244.1

(56) References Cited

U.S. PATENT DOCUMENTS

| | | | |
|---|---|---|---|
| 3,957,952 | * | 5/1976 | Naber et al. . |
| 4,323,544 | * | 4/1982 | Magder . |
| 4,382,021 | * | 5/1983 | Laurer et al. . |

OTHER PUBLICATIONS

Yoo et al., Sulfation of Al2O3 in Flue Gas Desulfurization by CuO/gamma–Alumina Sorbent, Ind. Eng. Chem. Res., 1994, 33, pp. 1786–1791.*

Jeong et al., Enhancement of the SO2 Sorption Capacity of CuO/gamma–Alumina Sorbent by an Alkali–Salt Promoter, Ind. Eng. Chem. Res., 1997, 36, pp. 5425–5431.*

* cited by examiner

Primary Examiner—Steven P. Griffin
Assistant Examiner—Christina Ildebrando
(74) Attorney, Agent, or Firm—Knobbe, Martens, Olson & Bear, LLP

(57) ABSTRACT

The present invention relates to a γ-Al₂O₃ sorbent impregnated with alkali salt and CuO, which has a superior SO₂ sorption capacity and a high regeneration conversion rate. A γ-Al₂O₃ sorbent of the present invention is impregnated with alkali salt and copper oxide, whose alkali salt and copper oxide(CuO) contents are 1 to 10 wt. % and 5 to 20 wt. % against 100 wt. % γ-Al₂O₃ carrier, respectively. The γ-Al₂O₃ sorbent of the invention has a superior SO₂ sorption capacity and a high regeneration conversion rate, which facilitates efficient removal of SO₂ by the conventional dry method.

18 Claims, 3 Drawing Sheets

γ-Al₂O₃ SORBENT IMPREGNATED WITH ALKALI SALT AND CUO

RELATED APPLICATION

This applicaton is a continuation of application Ser. No. 09/148,752, filed Sep. 4, 1998, now abandoned.

FIELD OF THE INVENTION

The present invention relates to a $\gamma$-$Al_2O_3$ sorbent impregnated with alkali salt and CuO, more specifically, to a $\gamma$-$Al_2O_3$ sorbent impregnated with alkali salt and CuO, which has a superior $SO_2$ sorption capacity and a high regeneration conversion rate.

BACKGROUND OF THE INVENTION

Sulfur dioxide($SO_2$) exhausted from combustion of fossil fuel pollutes air and acid rain containing $SO_2$ causes soil and water pollution. Accordingly, removal of $SO_2$ before emitting flue gas into the atmosphere has been regarded as an important matter, as the consumption of fossil fuel increases.

For the removal of $SO_2$, the following two methods have been suggested in the art: one is to prevent the generation of $SO_2$ itself by desulfurizing the fossil fuel prior to the combustion; and, the other is to remove $SO_2$ from the flue gas using appropriate sorbents, which can be further classified into dry method and wet method depending on the type of sorbent.

In accordance with the wet method, $SO_2$ is directly taken up by liquid sorbents such as water, alkali solution, which facilitates efficient removal of $SO_2$ with relatively inexpensive sorbents. However, the problem of disposal of wastes such as solid materials produced from the reaction with $SO_2$ and waste water remains unsolved.

On the other hand, in accordance with the dry method, $SO_2$ is removed by solid sorbent whose surface area is relatively large. This method has several advantages over the wet method that: no waste occurs and the expenses for equipment and operation may be cut down, since the sorbent can be regenerated and reused; and, the pure $SO_2$ produced from the regeneration step can be utilized as pure sulfur or sulfuric acid after appropriate treatment. However, it has revealed a shortcoming that sulfur removal efficiency is extremely low, since $SO_2$ is reacted with the sorbent for a relatively short time period compared with the wet method.

Naturally, many studies have focused on the development of a novel sorbent employed for dry method, which has a high $SO_2$ sorption capacity. For example, Centi et al. discloses a $\gamma$-$Al_2O_3$ sorbent impregnated with metal oxides (see: Centi et al., Ind. Eng. Chem. Res., 31:1947(1992)), where $SO_2$ is taken up by the sulfation of the metal oxides to give metal sulfides. Among the metal oxides, copper oxide(CuO) has been used as the most promising one, since it reacts with $SO_2$ rapidly and has a relatively high $SO_2$ removal capacity. However, the prior art sorbent is proven to be less satisfactory in the sense that the $SO_2$ removal capacity is not sufficient enough to be realized in industrial application. Under the circumstances, there are strong reasons for developing an alternative sorbent which has a superior sulfur removal capacity and a high regeneration conversion rate.

SUMMARY OF THE INVENTION

The present inventors have made an effort to improve the sulfur removal capacity and regeneration conversion rate of the conventional sorbents, and finally discovered that: the $SO_2$ sorption capacity of the sorbent can be improved by additional impregnation of alkali salt promoter into the conventional CuO/$\gamma$-$Al_2O_3$ sorbent, since the alkali salt promoter causes the $\gamma$-$Al_2O_3$ carrier to coparticipate in the desulfurization reaction with CuO catalyst.

A primary object of the invention is, therefore, to provide a $\gamma$-$Al_2O_3$ sorbent impregnated with alkali salt and CuO, which has a superior $SO_2$ sorption capacity and a high regeneration conversion rate.

The other object of the invention is to provide a process for preparing the $\gamma$-$Al_2O_3$ sorbent impregnated with alkali salt and CuO.

BRIEF DESCRIPTION OF DRAWINGS

The above and the other objects and features of the present invention will become apparent from the following descriptions given in conjunction with the accompanying drawings, in which.

DETAILED DESCRIPTION OF THE INVENTION

Figure 1:
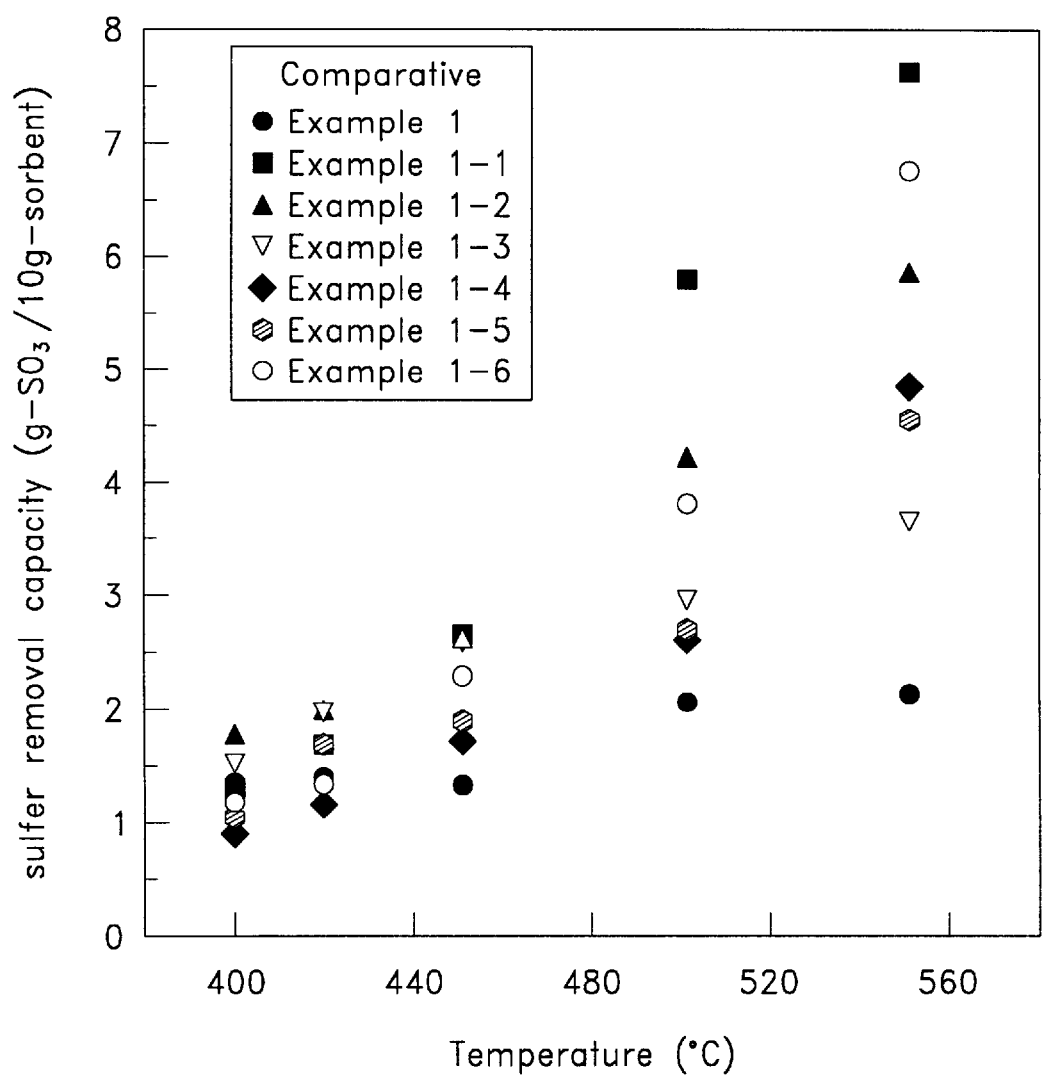
FIG. 1 is a graph showing the relationship between sulfation temperature and sulfur removal capacity (g-$SO_3$/10 g-sorbent)

A $\gamma$-$Al_2O_3$ sorbent of the present invention is impregnated with alkali salt and copper oxide, whose alkali salt and copper oxide(CuO) contents are 1 to 10 wt. % and 5 to 20 wt. % against 100 wt. % $\gamma$-$Al_2O_3$ carrier, respectively.

In $\gamma$-$Al_2O_3$ sorbent of the invention, $\gamma$-$Al_2O_3$ carrier as well as CuO catalyst contribute to desulfurization, based on the reaction mechanism as followings: when the sorbent is sulfated at a temperature of 400 to 650° C., $SO_2$ is first oxidized to $SO_3$ by CuO catalyst, and then, $SO_3$ reacts with CuO and $\gamma$-$Al_2O_3$ to give copper sulfate($CuSO_4$) and aluminium sulfate($Al_2(SO_4)_3$), respectively, which is accelerated by alkali salt promoter. On the other hand, the copper sulfate and aluminium sulfate thus produced can be regenerated at a temperature of 400 to 550° C., which makes it possible to reuse the sorbent.

The $\gamma$-$Al_2O_3$ sorbent of the present invention can be prepared by a process which comprises the following steps:

Step 1: Impregnation of alkali salt and copper-containing salt into $\gamma$-$Al_2O_3$ carrier To an aqueous solution containing 1 to 10 wt. % alkali salt and 15 to 65 wt. % copper-containing salt is added 100 wt. % $\gamma$-$Al_2O_3$. Then, water is evaporated from the solution by the aid of a rotary vacuum evaporator to give $\gamma$-$Al_2O_3$ impregnated with alkali salt and copper-containing salt. In this connection, lithium chloride(LiCl), lithium bromide (LiBr), lithium fluoride(LiF), sodium chloride(NaCl), sodium bromide(NaBr), sodium fluoride(NaF), potassium bromide(KBr), potassium chloride(KCl) or potassium fluoride(KF) is employed as the alkali salt and, copper nitrate or copper acetate is preferably employed as the copper-containing salt.

Step 2: Preparation of a $\gamma$-$Al_2O_3$ sorbent

The said $\gamma$-$Al_2O_3$ impregnated with alkali salt and copper-containing salt is calcinated at a temperature of 500 to 700° C., to give a $\gamma$-$Al_2O_3$ sorbent impregnated with 1 to 10 wt. % alkali salt and 5 to 20 wt. % copper oxide(CuO) against 100 wt. % $\gamma$-$Al_2O_3$ carrier.

The present invention is further illustrated in the following examples, which should not be taken to limit the scope of the invention.

Example 1

Preparation of γ-$Al_2O_3$ sorbents impregnated with alkali salt and CuO

Example 1-1

0.53 g of lithium chloride and 2.61 g of copper nitrate were dissolved in 200 ml of distilled water, and added 10 g of γ-$Al_2O_3$. Then, water was evaporated by the aid of a rotary vacuum evaporator at a temperature of 70 to 80° C. And then, the γ-$Al_2O_3$ impregnated with lithium chloride and copper nitrate was calcinated at 600° C., to give a γ-$Al_2O_3$ sorbent impregnated with 5 wt. % lithium chloride and 8 wt. % copper oxide against the carrier.

Example 1-2

A γ-$Al_2O_3$ sorbent impregnated with 5 wt. % alkali salt and 8 wt. % copper oxide against the carrier was prepared analogously as in Example 1, with the exception that sodium chloride is employed as the alkali salt.

Example 1-3

A γ-$Al_2O_3$ sorbent impregnated with 5 wt. % alkali salt and 8 wt. % copper oxide against the carrier was prepared analogously as in Example 1, with the exception that potassium chloride is employed as the alkali salt.

Example 1-4

A γ$Al_2O_3$ sorbent impregnated with 5 wt. % alkali salt and 8 wt. % copper oxide against the carrier was prepared analogously as in Example 1, with the exception that lithium fluoride is employed as the alkali salt.

Example 1-5

A γ-$Al_2O_3$ sorbent impregnated with 5 wt. % alkali salt and 8 wt. % copper oxide against the carrier was prepared analogously as in Example 1, with the exception that sodium fluoride is employed as the alkali salt.

Example 1-6

A -γ-$Al_2O_3$ sorbent impregnated with 5 wt. % alkali salt and 8 wt. % copper oxide against the carrier was prepared analogously as in Example 1, with the exception that lithium bromide is employed as the alkali salt.

Comparative Example 1

2.61 g of copper nitrate was dissolved in 200 ml of distilled water, and added 10 g of γ-$Al_2O_3$. Then, water was evaporated by the aid of a rotary vacuum evaporator at a temperature of 70 to 80° C. And then, the γ-$Al_2O_3$ impregnated with copper nitrate was calcinated at 600° C., to give a γ-$Al_2O_3$ sorbent impregnated with 8 wt. % copper oxide against the carrier.

Example 2

Measurement of $SO_2$ sorption capacity of sorbent

Sulfation of sorbent was carried out by adding 30 mg of each of the sorbents obtained in Examples 1-1 to 1-6 and Comparative Example 1 to a reactor, and injecting the air containing 1.5(v/v) % $SO_2$ into the reactor at a flow rate of 1 L/min for 2.5 hours, while varying temperature of the reactor to 400, 420, 450, 500 and 550° C., respectively. FIG. 1 shows the effect of sulfation temperature on sulfur removal capacity(g-SO3/10 g-sorbent). The sulfur removal capacities of the sorbents were determined by measuring the amount of $SO_3$ per a fixed amount of the sorbent, since $SO_2$ is oxidized to $SO_3$ prior to sorption. As can be seen in FIG. 1, it was clearly demonstrated that: $SO_2$ removal capacities of the alkali salt-added sorbents of the invention are superior to that of the alkali salt-free sorbent and increases rapidly in proportion to sulfation temperature.

Example 3

Measurement of the regeneration conversion rate of sorbent

Figure 2:
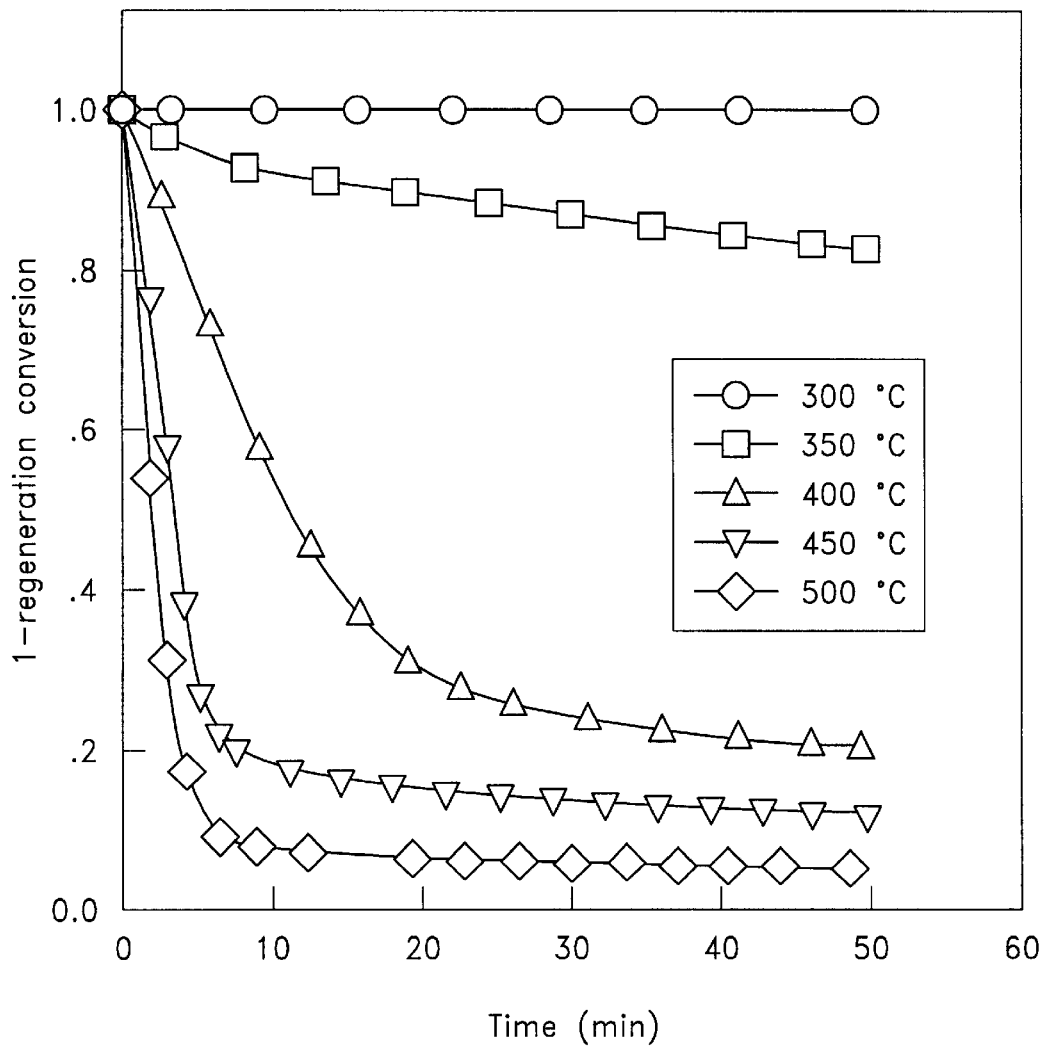
FIG. 2 is a graph showing the relationship between regeneration time and regeneration conversion rate.

Sulfation of sorbent was carried out analogously as in Example 2 at a temperature of 500° C. using the sorbent obtained in Example 1-2. Then, the sulfated sorbent was regenerated under an atmosphere of 5(v/v) % hydrogen and 95(v/v) % nitrogen at a temperature of 300, 350, 400, 450 and 500, respectively, and, the regeneration conversion rate was measured. FIG. 2 shows the effect of regeneration time on regeneration conversion rate. In FIG. 2, X- and Y-axes represent regeneration time and regeneration conversion rate, respectively. As can be seen in FIG. 2, the regeneration conversion rate of the sorbent was over 0.7 when it was regenerated at 400° C. for 20 minutes.

Example 4

Effect of the number of sulfation-regeneration cycle on the sulfur removal capacity.

Example 4-1

Sulfation and regeneration of a sorbent were repetitively carried out analogously as in Examples 2 and 3, respectively, at a temperature of 500° C. using the sorbent obtained in Example 1-2. Then, the sulfur removal capacities depending on the number of sulfation-regeneration cycle were determined and shown in FIG. 3.

Example 4-2

Sulfation and regeneration of a sorbent were repetitively carried out analogously as in Examples 2 and 3, respectively, at a temperature of 440° C. using the sorbent obtained in Example 1-2. Then, the sulfur removal capacities depending on the number of sulfation-regeneration cycle were determined and shown in FIG. 3.

Example 4-3

Sulfation and regeneration of a sorbent were repetitively carried out analogously as in Examples 2 and 3, respectively, at a temperature of 500° C. using the sorbent obtained in Comparative Example 1. Then, the sulfur removal capacities depending on the number of sulfation-regeneration cycle were determined and shown in FIG. 3.

Example 4-4

Sulfation and regeneration of a sorbent were repetitively carried out by using the sorbent obtained in Comparative Example 1, where sulfation was accomplished analogously as in Example 2 at a temperature of 300° C. and regeneration was accomplished analogously as in Example 3 at a temperature of 500° C. And then, the sulfur removal capacities depending on the number of sulfation-regeneration cycle were determined and shown in FIG. 3.

Figure 3:
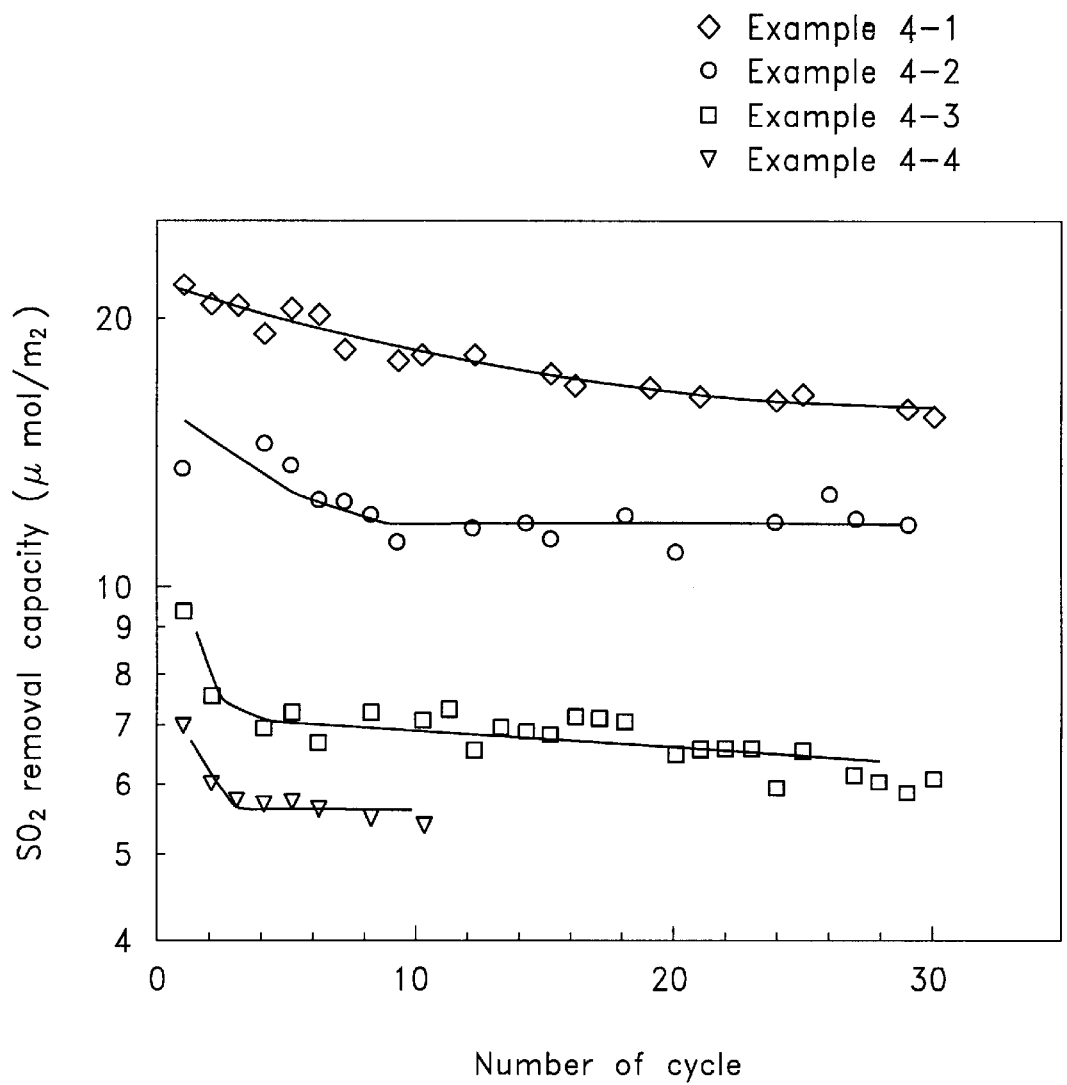
FIG. 3 is a graph showing the relationship between the number of sulfation-regeneration cycle and sulfur removal capacity.

As can be seen in FIG. 3, it was strongly suggested that: the repetitive sulfation-regeneration cycle has little effect on the sulfur removal capacity of the alkali salt-added sorbent of the invention; and, the sulfur removal capacity of the invented sorbent is superior to that of the conventional alkali salt-free sorbent and increases in proportion to the sulfation-regeneration temperature.

As clearly illustrated and demonstrated as aboves, the present invention provides a γ-$Al_2O_3$ sorbent impregnated with alkali salt and CuO and a process for preparing the same. The γ-$Al_2O_3$ sorbent of the invention has a superior $SO_2$ sorption capacity and a high regeneration conversion rate, which facilitates efficient removal of $SO_2$ by the conventional dry method.

What is claimed is:

1. A regenerative desulfurizing composition comprising γ-$Al_2O_3$, CuO and a lithium halide, the γ-$Al_2O_3$ carrying the CuO and lithium halide.

2. The composition as defined in claim 1, wherein with reference to 100 wt. % of γ-$Al_2O_3$, the lithium halide is in the range of 1–10 wt. % and CuO is in the range of 5–20 wt. %.

3. The composition as defined in claim 1, wherein the lithium halide is one selected from the group consisting of LiCl, LiBr, and LiF.

4. The composition as defined in claim 3, wherein the lithium halide is LiCl.

5. A method of desulfurizing a gas containing $SO_2$, the method comprising contacting the gas with the desulfurizing composition of claim 1, wherein the $\gamma$-$Al_2O_3$ acts as a participant in a desulfurization reaction.

6. The method as defined in claim 5, wherein the gas contacting the desulfurizing composition is at a temperature higher than 400° C.

7. The method as defined in claim 6, wherein the gas contacting the desulfurizing composition is at a temperature between 500–550° C.

8. The method as defined in claim 5, wherein the lithium halide is LiCl.

9. A method of regenerating a sulfated form of the desulfurizing composition of claim 1, the method comprising contacting the sulfated form of the desulfurizing composition with a gaseous atmosphere comprising hydrogen and nitrogen.

10. The method as defined in claim 9, wherein the sulfated form of the desulfurizing composition is contacted with the gaseous atmosphere at a temperature between 300–500° C.

11. The method as defined in claim 9, wherein the gaseous atmosphere comprises 5 v/v % of hydrogen and 95 v/v % of nitrogen.

12. A method of making a sorbent comprising:
preparing an aqueous solution comprising a lithium halide and a copper-containing salt dissolved in water;
mixing $\gamma$-$Al_2O_3$ into the aqueous solution and evaporating water from the solution to impregnate the lithium halide and the copper-containing salt into the $\gamma$-$Al_2O_3$; and
calcinating the $\gamma$-$Al_2O_3$ impregnated with the lithium halide and the copper-containing salt, thereby producing a sorbent composition comprising $\gamma$-$Al_2O_3$ impregnated with CuO and lithium halide.

13. The method as defined in claim 12, wherein the aqueous solution contains 1–10 wt. % of the lithium halide and 15–65 wt. % of the copper-containing salt with reference to 100 wt. % of $\gamma$-$Al_2O_3$.

14. The method as defined in claim 12, wherein the water is evaporated at a temperature from 70 to 100° C.

15. The method as defined in claim 12, wherein the $\gamma$-$Al_2O_3$ impregnated with the lithium halide and the copper-containing salt is calcinated at a temperature from 500 to 700° C.

16. The method as defined in claim 12, wherein the lithium halide is one selected from the group consisting of LiCl, LiBr, and LiF.

17. The method as defined in claim 16, wherein the lithium halide is LiCl.

18. The method as defined in claim 12, wherein the copper-containing salt is copper nitrate or copper acetate.

\* \* \* \* \*